United States Patent [19]
Ellsworth

[11] Patent Number: 5,526,920
[45] Date of Patent: Jun. 18, 1996

[54] GATE CLOSURE FOR CONVEYOR

[75] Inventor: Clayton S. Ellsworth, Norfolk, Nebr.

[73] Assignee: EBM Mill & Elevator Supply, Norfolk, Nebr.

[21] Appl. No.: 365,579

[22] Filed: Dec. 27, 1994

[51] Int. Cl.⁶ .................................................. B65G 33/00
[52] U.S. Cl. ...................... 198/671; 198/658; 198/860.4
[58] Field of Search ............................... 198/657, 658, 198/670, 671, 735.4, 735.5, 860.1, 860.4; 222/560, 561

[56] References Cited

U.S. PATENT DOCUMENTS

| | | | |
|---|---|---|---|
| 961,958 | 6/1910 | Hartley | 198/671 X |
| 3,279,436 | 10/1966 | Haen et al. | 198/657 X |
| 3,279,592 | 10/1966 | Kerkvliet | 198/658 X |
| 3,346,092 | 10/1967 | Bowden et al. | 198/860.4 |
| 3,387,696 | 6/1968 | Prentice | 198/671 X |
| 4,136,769 | 1/1979 | Dostal, Jr. | 198/860.4 |
| 4,454,943 | 6/1984 | Moller | 198/671 X |

FOREIGN PATENT DOCUMENTS

| | | | |
|---|---|---|---|
| 2579569 | 10/1986 | France | 198/860.4 |
| 2201390 | 9/1988 | United Kingdom | 198/671 |

*Primary Examiner*—James R. Bidwell

[57] ABSTRACT

A flexible gate usable with grain transporting devices such as conveyor troughs or tubes. The gate is formed of a flexible material to be able to flex around the trough and is slid circumferentially around the bottom of the trough by an outside motor. The gate material has skived edges so that when pulled snug around the trough the unskived section slides within the gate opening to provide a relatively smooth lower surface to the trough. The motor is arranged to open and close the gate while the gate material is loose on the trough and to pull that gate material into the gate opening when the gate is closed. The device may also be operated by a manually controlled lever or crank.

9 Claims, 1 Drawing Sheet

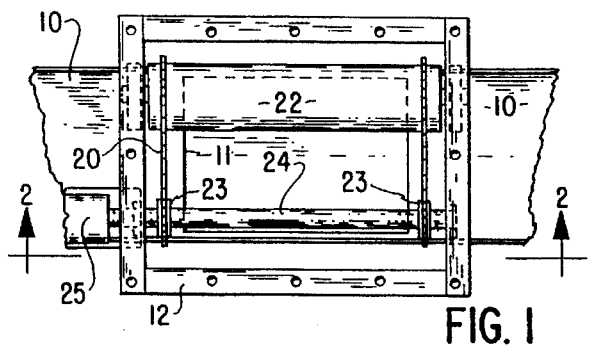
FIG. 1
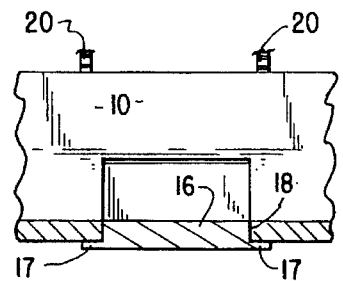
FIG. 4
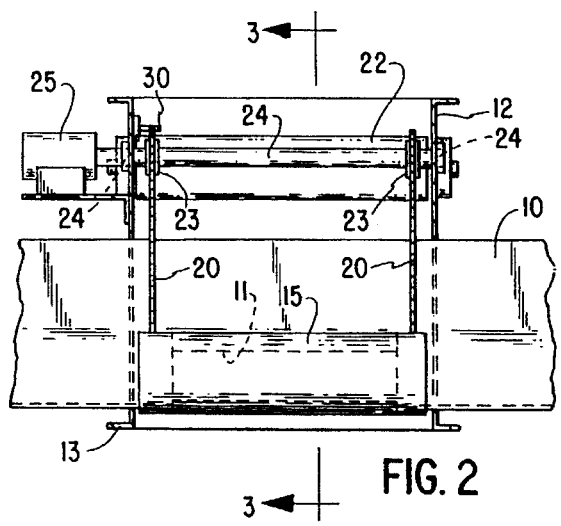
FIG. 2  FIG. 3
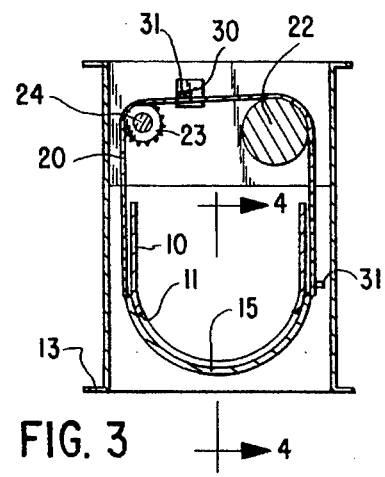
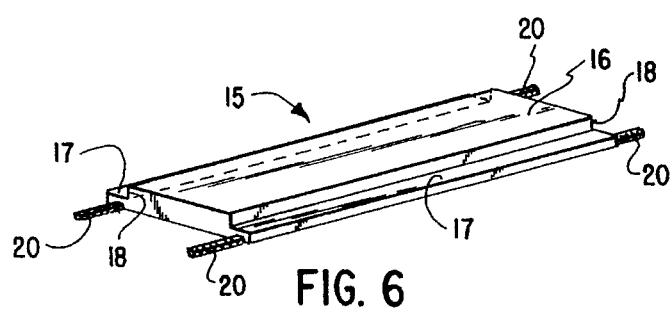
FIG. 6
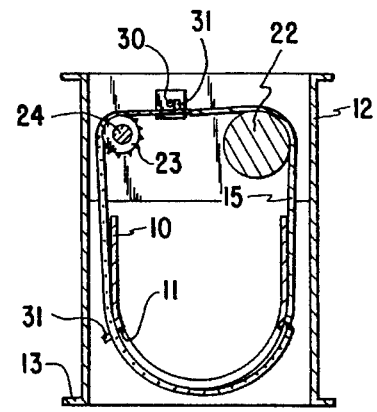
FIG. 5

GATE CLOSURE FOR CONVEYOR

BACKGROUND AND SUMMARY OF THE INVENTION

This invention pertains to closures of gate openings in grain conveyors, and more particularly to a closure which maintains a relatively smooth passage for grain running over the gate opening when the gate is closed. Such openings in a conveyor track are commonly used for the discharge of grain from the conveyor at selected desired locations along the length of the conveyor.

Ordinarily such gate openings may be closed by curved metal sheets, usually axially slidable along the conveyer to open or close the opening to allow discharge or retention of the grain in the conveyor trough. The metal gate fits quite closely to the bottom of the trough to prevent leakage.

This type of gate suffers a number of drawbacks, a few of which may be severe, and all annoying. First, the opening, even when closed, leaves hard edges having a thickness equal to that of the metal wall of the bottom of the trough. These edges can be relatively sharp so that a substantial quantity of the grain is split or damaged on these edges, thus making for a lower grade of product. This may be particularly important where the grain is a seed grain for sale to farmers. Even if the grain is to be used for feed or for export, the grading quality is of importance.

The second disadvantage of the metal gate is that it is somewhat difficult to motorize. Particles of grain tend to get caught between the gate and the trough, and so to jam the sliding motion unless more force is used than a normal small motor might provide. This stickiness can be aggravated by corrosion on either part or between the slide and the trough.

By the present invention, most of the damage to conveyed grain is eliminated and the gate is readily controlled by a relatively small motor. Although the motor is preferred, manual operation may be possible. In either case, only a small amount of energy is required.

BRIEF DESCRIPTION OF THE DRAWINGS

FIG. 1 is a top plan view of a portion of a conveyor including a gate according to the present invention, FIG. 2 is a view from line 2—2 of FIG. 1, FIG. 3 is a sectional view from line 3—3 of FIG. 2, showing the gate closed, FIG. 4 is a partial detailed sectional view from line 4—4 of FIG. 3, FIG. 5 is a view similar to FIG. 3 showing the gate fully open, and FIG. 6 is a perspective view of the gate material removed from the trough and lying flat.

DESCRIPTION

Briefly, this invention comprises a flexible gate for an opening in a grain conveyor trough which will close the opening and which can provide a relatively smooth surface for passage of grain past the opening when the gate is closed.

More specifically and referring to the drawings, the gate is designed for use in a trough 10 designed for the movement of grain. Such a trough may be U-shaped in cross section, or may be tubular, and commonly contains spiral flighting (not shown) designed to move grain. With a rectangular trough, drag flighting may be used. In some installations, where there is need for diverting grain at one or more intermediate points along the conveyor, openings 11 may be provided so that grain can be dropped at those points. Such openings are typically surrounded by a housing 12 having a lower flange 13 to which is fastened a branch pipe (not shown) adapted to lead or to carry the grain in an alternative direction.

The opening 11 is typically closed by a gate—often a metal slide adapted to be moved axially on the conveyor. This results in a clumsy situation, especially for motorized closure and opening of the gate.

The present invention substantially eliminates that problem by providing a gate closure 15 composed of a relatively thick piece of rubber or rubberized material such as belting. The closure piece 15 is somewhat wider than the axial dimension of the opening 11. The full thickness of the material of the closure 15 extends the complete axial length of the opening 11, forming a pad 16 (FIG. 6). At its edges the pad 16 is skived or trimmed so that flanges 17 are formed. As shown in FIG. 4, the shoulder 18 at the edges of the pad are just deep enough so that when the gate is closed as in FIG. 4, the inner surface of the pad 16 is substantially flush with the inner surface of the trough 10. This results in the desired smooth surface over which the grain can be moved when the gate is closed.

Opening and closing of the gate is also eased by the use of a flexible material. Chains 20 or the like are fixed to the ends of the gate closure material 15. By fastening the chain 20 close to the corners of the closure 15—and particularly in the area of the flanges 17, they can extend fully around the trough without blocking the opening 11 in any way.

In FIGS. 1–4, the gate is shown closed. In that position, the chains 20 extend from the closure 15 along the side of the trough 10 and then upward and around an idler 22 and over sprockets 23 which are fixed to a sprocket shaft 24. This shaft is journalled in bearings 26 on the housing 12. A torque motor 25 drives the shaft 24 to turn the sprockets simultaneously so that they always pull the chains 20 equally. This motor is of the type which automatically stops when the torque on the shaft 24 reaches a certain predetermined limit.

With this type of motor, the opening and closing is greatly simplified. One of the problems with this type of closure is getting the opening 11 tightly sealed when shut, and yet be flexibly enough to move smoothly when the gate is being opened.

To measure when the gate is fully open or fully closed, a stop bar 30 is fixed to the housing 12 and extends over the portion of the chain 20 between the idler 22 and the sprocket 23. Stops 31 are fixed to the chain 20 in position to engage the bar 30 at the two limits of fully open and fully closed. If limit switches were actuated by the bar 30, the device would work though poorly. The reason is that the chain would always be at substantially the same tension—usually either too tight too loose.

The torque motor 25 greatly alleviates that problem when used as shown. When the motor is rotating to close the gate as shown in FIG. 3, the sprocket 23 pulls the chain against the stop 31 so that substantial tension exists in the chain. That tension tends to pull the closure 15 against the bottom of the trough 10 and pulls the pad 16 into the opening 11. Eventually, the limit of torque is reached on the motor and it turn off with the gate fully closed.

The reverse action causes a little slack in the chains 20 so that gravity tends to drop the closure 15 away from the trough 10 and relaxes the tension so that the closure 15 will slide readily against the side of the trough 10 as the gate is opening. That relaxation exists even as the opposite stop 31 hits the bar 30. The tension then exists only on the chain between the sprocket 23 and the bar 30 with the rest of the operating assembly being relaxed. Thus by use of this type of motor engaged as shown, the opening and closing of the gate is made relatively simple while preserving the advantages of the smooth inner surface when the gate is closed.

I claim as my invention:

1. In combination with a grain conveyor having a bottom wall of one thickness and a gate opening in said bottom wall, said opening having upstream and downstream edges longitudinally spaced on said conveyor, closure means for said opening including belt means wrapped circumferentially at least partly around said conveyor at the position of said gate opening, said closure means including a pad formed on said belt means and being formed to substantially close said gate opening, said pad being raised from said belt means by said one thickness of said bottom wall whereby when said closure means is in said position closing said gate opening, the pad forms a relatively smooth surface with said bottom wall.

2. In combination with a grain-conveyor having a bottom wall of one thickness and a gate opening in the bottom wall of said conveyor, said opening having upstream and downstream edges longitudinally spaced on said conveyor, belt means formed of a material having a substantially greater thickness then said one thickness, said belt means being wrapped circumferentially at least partly around said conveyor, said belt means having upstream and downstream edges corresponding to the upstream and downstream edges of said gate opening in both directions, said edges of said belt means being skived to form a shoulder on said upstream and downstream edges of said belt by a thickness equal to said one thickness whereby said belt means is formed with a pad substantially closing said gate opening and providing a nearly smooth inner surface of said conveyor, and means to move said belt means circumferentially of said conveyor from a position closing said gate opening to a position exposing said gate opening.

3. The combination of claim 2 in which said gate closure means is of rectangular plan form, pulling means attached to each corner of said plan form adapted to pull said closure means circumferentially of said conveyor.

4. The combination of claim 3 in which said means to move said belt means includes a motorized device operably engaged with said pulling means at a fixed position on said pulling means.

5. The combination of claim 4 in which said motorized device includes a torque motor, stop means on said pulling devices adapted to stop said torque motor at opposite ends of travel of said closure means.

6. The combination of claim 5 in which said pulling means includes one pair of opening pulling means and one pair of closing pulling means, said stop means including a bar on said conveyor and stop devices on at least one of each pair of pulling means, said stop devices being arranged to engage said bar to stop said torque motor.

7. The combination of claim 6 in which the stop device on said closing pulling means is at a location such that the fixed position on said pulling means is between said stop device and said corner of attachment between said pulling means and said closure means.

8. The combination of claim 4 in which said pulling means are chains, and said motorized device includes a sprocket engaged with at least one of said chains.

9. The combination of claim 8 in which idlers are mounted along the path of said chains to direct the chains in the proper path.

* * * * *